(12) United States Patent
Sung et al.

(10) Patent No.: US 8,675,510 B2
(45) Date of Patent: Mar. 18, 2014

(54) SCHEDULER AND SCHEDULING METHOD FOR TRANSMITTING DATA IN MIMO BASED WIRELESS LAN SYSTEM

(75) Inventors: Dan Keun Sung, Daejeon (KR); Bang Chul Jung, Seoul (KR); Jin Hu, Yuseong-gu (KR); Ho Young Hwang, Seoul (KR)

(73) Assignee: Pantech Co., Ltd., Seoul (KR)

( * ) Notice: Subject to any disclaimer, the term of this patent is extended or adjusted under 35 U.S.C. 154(b) by 627 days.

(21) Appl. No.: 12/582,164

(22) Filed: Oct. 20, 2009

(65) Prior Publication Data
US 2010/0103835 A1    Apr. 29, 2010

(30) Foreign Application Priority Data
Oct. 23, 2008 (KR) .......................... 10-2008-0104313

(51) Int. Cl.
*G01R 31/08* (2006.01)
(52) U.S. Cl.
USPC ............ 370/252; 370/329; 370/338; 375/260
(58) Field of Classification Search
USPC ......................................... 370/252, 338, 329
See application file for complete search history.

(56) References Cited

U.S. PATENT DOCUMENTS

| | | | | |
|---|---|---|---|---|
| 2002/0097697 | A1* | 7/2002 | Bae et al. | 370/335 |
| 2009/0124290 | A1* | 5/2009 | Tao et al. | 455/562.1 |
| 2009/0262676 | A1* | 10/2009 | Labbe et al. | 370/312 |
| 2010/0086072 | A1* | 4/2010 | Mazet et al. | 375/267 |
| 2010/0220668 | A1* | 9/2010 | Yamada et al. | 370/329 |

FOREIGN PATENT DOCUMENTS

WO    2008/071102    6/2008

* cited by examiner

*Primary Examiner* — David Oveissi
(74) *Attorney, Agent, or Firm* — H.C. Park & Associates, PLC

(57) ABSTRACT

A scheduler and scheduling method that may select a data transmission time interval and a data transmitting station are included in a multi-user Multiple Input Multiple Output (MIMO) communication system. An access point may include a receiver to receive channel measurement signals from stations using a plurality of receive antennas; a channel estimation unit to generate channel state matrices with respect to wireless channels formed from the stations to the receive antennas using the channel measurement signals; and a scheduler to select at least one transmitting station from the stations by considering the channel state matrices and a number of the receive antennas. The receiver may receive a data stream from the selected transmitting stations. Stations receive identifiers corresponding to transmitting stations and/or transmitting antennas to identify stations or antennas for transmitting data streams to the access point.

26 Claims, 9 Drawing Sheets

SCHEDULER AND SCHEDULING METHOD FOR TRANSMITTING DATA IN MIMO BASED WIRELESS LAN SYSTEM

CROSS-REFERENCE TO RELATED APPLICATION

This application claims priority from and the benefit of Korean Patent Application No. 10-2008-0104313, filed on Oct. 23, 2008, which is hereby incorporated by reference for all purposes as if fully set forth herein.

BACKGROUND OF THE INVENTION

1. Field of the Invention

The present invention relates to a mobile communication system, and more particularly, to a scheduler and a scheduling method that may select a data transmission time interval and a data transmitting station and/or data transmitting antenna in a multi-user Multiple Input Multiple Output (MIMO) communication system.

2. Discussion of the Background

A wireless local area network (WLAN) is a local area network where at least some nodes of the network are connected without using a cable. The WLAN may avoid the cost of setting up a cable-based network, and may also provide users with the convenience of a network access environment, while maintaining the simple implementation and expandability of a wired LAN.

Various types of portable devices, such as a portable digital assistant (PDA), a portable media player (PMP), a tablet PC, and the like, are currently being used. Also, many users desire an ability to connect to a network with the portable devices. Therefore, there is an increasing interest regarding the WLAN.

A representative standard associated with the WLAN may include an Institute of Electrical and Electronics Engineers (IEEE) 802.11 Wireless-Fidelity (Wi-Fi) standard. Since the IEEE 802.11 standard was released in 1997, revisions including 11a, 11b, and 11g have been implemented. The IEEE 802.11n version is currently in development.

The IEEE 802.11n version, which is still in the standardization process, may adopt a system configuration based on a MIMO communication scheme to support a higher data transmission rate in a physical layer. The MIMO communication scheme is a scheme where a transmission end may transmit data via multiple paths using multiple transmit antennas, and a reception end may receive data via multiple paths using multiple receive antennas. Through this, the MIMO communication scheme may enhance a data transmission rate and may reduce interference in a multi-path environment.

Accordingly, in the IEEE 802.11n WLAN, a station and an access point each may include multiple antennas. Through this configuration, the IEEE 802.11n WLAN may support an enhanced data transmission rate in a physical layer in comparison to existing versions. However, even if performance is enhanced in the physical layer, there may be some constraints on improving the data transmission throughput due to a limit of a protocol of a Media Access Control (MAC) layer.

Stations accessing a particular access point may transmit data to the particular access point in the same time slot. If the particular access point includes only a single receive antenna, the access point may not successfully receive all data transmitted from the stations. Specifically, if two stations simultaneously transmit data streams, the access point having a single receive antenna may not successfully receive the data streams. Instead, the simultaneously transmitted data streams may collide with each other and an error may occur in the data streams.

In this case, each station may not receive an acknowledgement (ACK) from the access point and thus may retransmit the data.

If a single access point covers a small number of stations, a collision probability may be lower so that performance deterioration according to frame retransmission may be insignificant. However, as a number of stations increases, the collision probability may also increase and thus a data transmission throughput may deteriorate.

Accordingly, there is a need for a new technology that may reduce the risk of data collision by applying a MIMO technology to a scheduler of a MAC layer.

SUMMARY OF THE INVENTION

Exemplary embodiments of the present invention provide a scheduler and a scheduling method that may transmit data using a characteristic of a Multiple Input Multiple Output (MIMO) channel.

Exemplary embodiments of the present invention also provide a scheduler and a scheduling method that may simultaneously receive data at an access point having multiple receive antennas from a plurality of stations.

Additional aspects of the invention will be set forth in the description which follows, and in part will be apparent from the description, or may be learned by practice of the invention.

An exemplary embodiment of the present invention discloses an access point including a plurality of receiving antennas, a receiver to receive channel measurement signals from a first station and a second station; a channel estimation unit to generate channel state matrices with respect to wireless channels formed from the first station and the second station to the plurality of receive antennas using the received channel measurement signals; and a scheduler to select the first station as a first transmitting station according to the channel state matrices and a number of the receive antennas. The receiver receives a first data stream transmitted from the first transmitting station.

An exemplary embodiment of the present invention discloses a station including a transmitter to transmit a first channel measurement signal to an access point using a first transmit antennas; a receiver to receive an identifier of a first transmitting station that is selected by the access point based on a received channel measurement signal; and a control unit to determine a data transmission rate by considering a number of transmit antennas of the station and a number of receive antennas of the access point. If the identifier corresponds to the station, the transmitter transmits a data stream to the access point based on the identifier and the data transmission rate.

An exemplary embodiment of the present invention discloses a method for receiving data, including receiving channel measurement signals from a first station and a second station using a plurality of receive antennas; generating channel state matrices with respect to wireless channels formed from the first station and the second station to the plurality of receive antennas using the received channel measurement signals; selecting the first station as a first transmitting station to transmit data according to the channel state matrices and a number of the receive antennas; and receiving a data stream from the first transmitting station.

An exemplary embodiment of the present invention discloses a method for transmitting data, including transmitting a first channel measurement signal to an access point using a first transmit antennas; receiving an identifier of a first transmitting station that is selected by the access point based on a received channel measurement signal; determining a data transmission rate by considering a number of transmit antennas of the station and a number of receive antennas of the access point; and if the identifier corresponds to the station, transmitting a data stream to the access point based on the identifier and the data transmission rate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1:
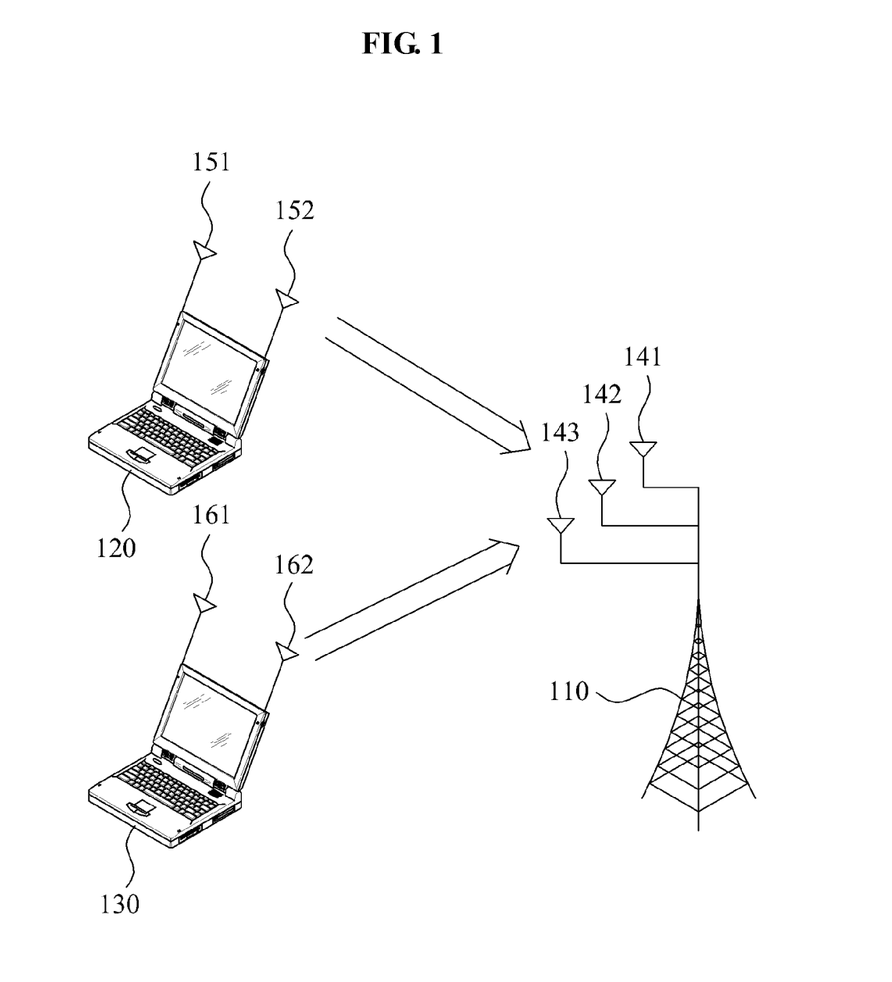
FIG. 1 is a diagram illustrating a concept of a Multiple Input Multiple Output (MIMO) system according to an exemplary embodiment of the present invention.

FIG. 1 is a diagram illustrating a concept of a Multiple Input Multiple Output (MIMO) system according to an exemplary embodiment of the present invention. Hereinafter, an operation of the MIMO system will be described in more detail with reference to FIG. 1.

Referring to FIG. 1, an access point 110 may include receive antennas 141, 142, and 143. Although only three receive antennas 141, 142, and 143 are shown in FIG. 1 for better comprehension and ease of description, the access point 110 could include four or more receive antennas. The access point 110 may receive multiple data streams using the receive antennas 141, 142, and 143 according to a beamforming reception scheme, a spatial multiplexing reception scheme, and the like.

The access point 110 includes receive antennas 141, 142, and 143 and may receive multiple data streams. Specifically, even if stations 120 and 130 simultaneously transmit data streams, the access point 110 may classify the data streams and thereby receive the data streams. Also, an error in receiving the data streams may be reduced by the access point 110.

A number of data streams that the access point 110 may simultaneously receive may depend upon the number of receive antennas included in the access point 110. Specifically, if N receive antennas are included in the access point 110, the access point 110 may simultaneously receive a maximum of N data streams. Therefore, the access point 110 may simultaneously receive the data streams from a maximum of N stations. Further, the access point 110 may select, as transmitting stations, N stations from among a plurality of stations, and receive the data streams from the selected transmitting stations.

Additionally, station 120 may include transmit antennas 151 and 152, and station 130 may include transmit antennas 161 and 162. The stations 120 and 130 may transmit a data stream to the access point 110 using each transmit antenna 151 and 152, and 161 and 162, respectively. The data streams may be transmitted using a spatial multiplexing transmission scheme and the like.

Even if the stations 120 and 130 transmit the data streams to the access point 110, a total number of data streams to be transmitted by the stations 120 and 130 may be the same as or less than a number of receive antennas included in the access point 110 so that the access point 110 may simultaneously receive the data streams from a maximum of N stations.

Figure 2:
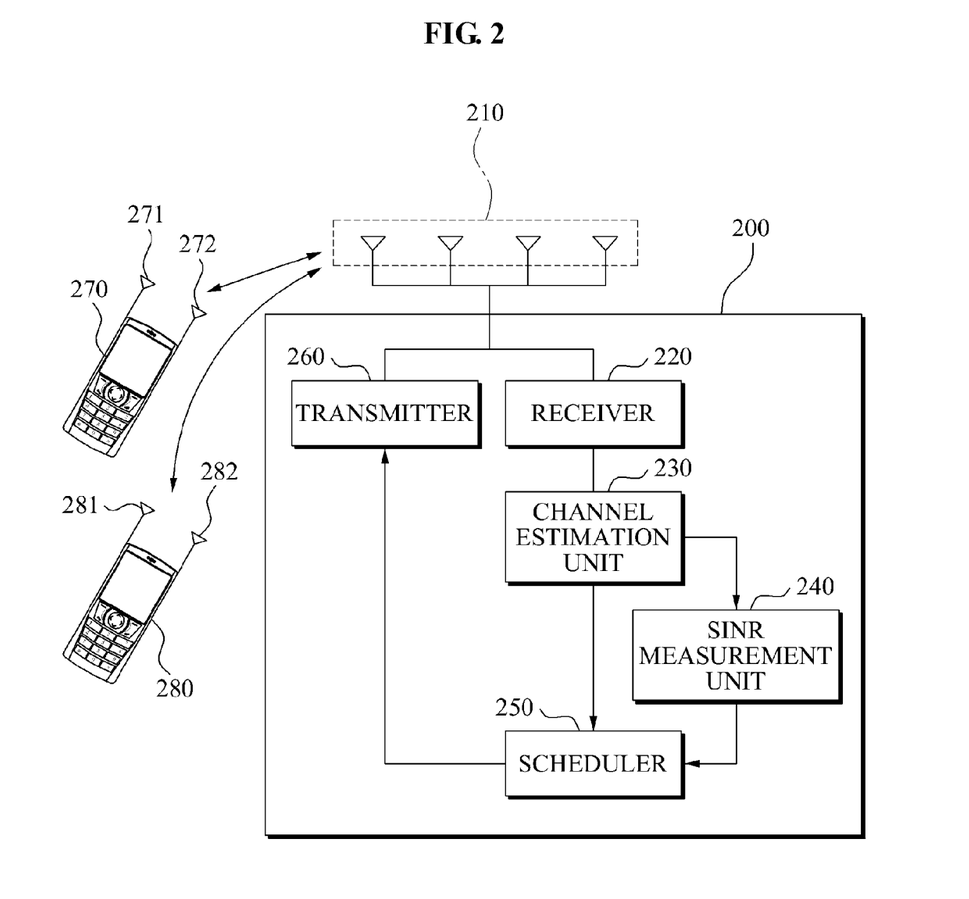
FIG. 2 is a block diagram illustrating a structure of an access point according to an exemplary embodiment of the present invention.

FIG. 2 is a block diagram illustrating a structure of an access point according to an exemplary embodiment of the present invention. Hereinafter, an operation of the access point 200 will be described in more detail with reference to FIG. 2.

The access point 200 may include receive antennas 210, a receiver 220, a channel estimation unit 230, a signal-to-interference and noise ratio (SINR) measurement unit 240, a scheduler 250, and a transmitter 260.

The receiver 220 may receive a channel measurement signal using the receive antennas 210. Stations 270 and 280 may each transmit a channel measurement signal to the access point 200. Specifically, the stations 270 and 280 may each transmit the channel measurement signal using transmit antennas 271 and 272, and 281 and 282, respectively.

Each of the stations 270 and 280 may transmit a pseudo-noise (PN) code having a different phase offset. The receiver 220 may identify the stations 270 and 280 using the different phase offsets.

Each of the stations 270 and 280 may transmit an orthogonal code. The receiver 220 may identify a channel measurement signal transmitted from each of the stations 270 and 280 using an orthogonality of the orthogonal codes.

Additionally, each of the stations 270 and 280 may transmit a pseudo-noise code having a different phase offset for each transmit antenna 271, 272, 281, and 282. Also, each of the stations 270 and 280 may transmit a different pseudo code for each transmit antenna 271, 272, 281, and 282. The receiver 220 may identify the channel measurement signal transmitted from each of the transmit antennas 271, 272, 281, and 282 using the phase offset or the orthogonality of the pseudo-noise code.

The channel estimation unit 230 may generate channel state matrices with respect to wireless channels formed from each of the stations 270 and 280 to the receive antennas 210 using the received channel measurement signals. If each of the stations 270 and 280 includes only a single transmit antenna, a channel state matrix may be in a form of a vector.

The scheduler 250 may select at least one transmitting station from the stations 270 and 280 by considering a number of the receive antennas 210 and the channel state matrices. The scheduler 250 may select, as transmitting stations, a number of stations equal to a number of receive antennas 210, or may select, as transmit antennas, a number of stations that is less than the number of receive antennas 210.

The receiver 220 may receive a data stream from each selected transmitting station. The receiver 220 may receive more than one data stream from a particular transmitting station, such as if the particular transmitting station has more than one transmit antenna.

Further, the scheduler 250 may determine a number of data streams to be transmitted by each transmitting station. The scheduler 250 may determine a number of data streams simultaneously transmitted to be the same as or less than a number of receive antennas 210 of the access point 200.

Further, the scheduler 250 may determine, individually with respect to each transmitting station 270 and 280, a data reception time interval when the receiver 220 may receive data from the stations 270 and 280 selected as the transmitting stations. Specifically, the scheduler 250 may individually determine the data transmission time interval for each of the stations 270 and 280. The scheduler 250 may determine a data transmission time interval for each of transmitting stations so that a number of data streams to be simultaneously transmitted by the transmitting stations is the same as or less than a number of receive antennas 210 of the access point.

The scheduler 250 may select a transmitting station by further considering a number of transmit antennas included in each of the potential transmitting stations. For example, a station with more transmit antennas may be selected as the transmitting station.

For example, stations 270 and 280 include transmit antennas 271 and 272, and 281 and 282, respectively. Thus, a total number of data streams to be transmitted by the stations 270 and 280 may be the same as or less than a number of transmit antennas 271, 272, 281, and 282.

The scheduler 250 may select a transmitting station so that stations with multiple transmit antennas may transmit multiple data streams. If the stations transmit the multiple data streams to the access point 200, a data transmission throughput may be enhanced in comparison to a case where only a single data stream is transmitted.

The scheduler 250 may also select a particular transmit antenna to transmit a data stream to the access point 200. An antenna selected for transmitting a data stream to the access point 200 will be referred to as a "data transmit antenna." Additionally, fewer than all of the transmit antennas of a single transmitting station may be selected as the data transmit antenna. Specifically, if a transmitting station includes four transmit antennas, only two transmit antennas could be selected as the data transmit antennas.

The SINR measurement unit 240 may measure an SINR with respect to wireless channels formed from transmitting stations to the access point 200, based on the channel measurement signals. The scheduler 250 may select, from the plurality of stations, a transmitting station that corresponds to a wireless channel with an excellent SINR.

Each transmit antenna of each station may transmit a different channel measurement signal. For example, the SINR measurement unit 240 may measure an SINR of each wireless channel formed from the transmit antennas 271, 272, 281, and 282 to the receive antennas 210. The scheduler 250 may determine, individually with respect to the stations 270 and 280 selected as transmitting stations, one or more data transmit antennas to transmit data to the access point 200 by considering the SINR of each wireless channel.

Additionally, all of a first station and a second station may be selected as transmitting stations. Also, a single transmit antenna of the first station may be selected as a data transmit antenna. Two transmit antennas of the second station may be selected as data transmit antennas. In this case, the first station may transmit data to an access point using the single transmit antenna. The second station may transmit data to the access point using the two transmit antennas. The access point may successfully receive, using at least three receive antennas, a single data stream transmitted from the first station, and two data streams transmitted from the second station.

The transmitter 260 may transmit identifiers of transmitting stations, selected by the scheduler 250, to the stations. Each station may receive the identifiers and compare the received identifiers with its own identifier to determine whether the corresponding station is selected as a transmitting station.

The transmitter 260 may transmit identifiers of data transmit antennas to each station. Each station may receive the identifiers and compare the received identifiers with its own transmit antenna identifiers to determine whether the corresponding transmit antennas are selected as data transmit antennas to transmit data to the access point 200.

Figure 3:
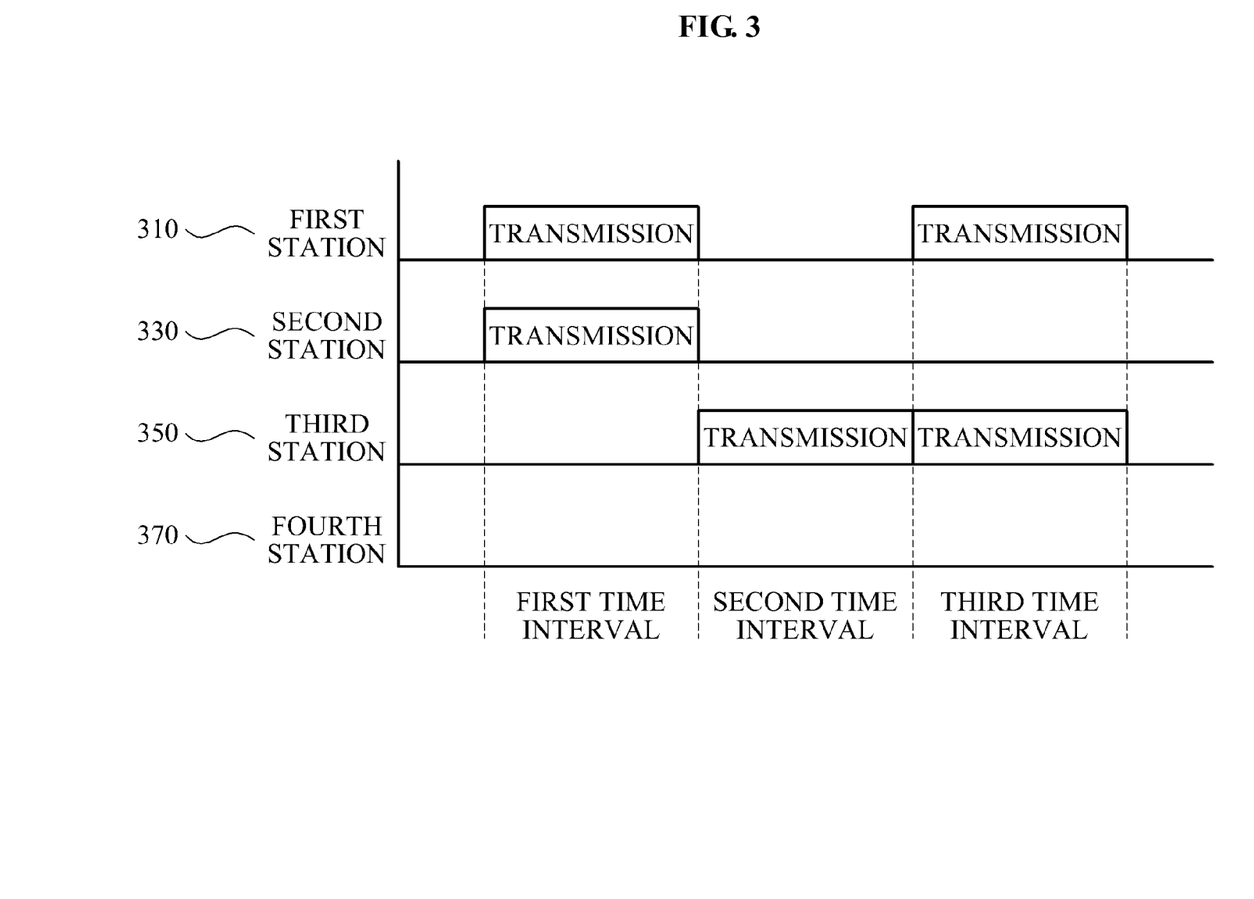
FIG. 3 is a diagram illustrating an example of transmitting, by a plurality of stations, data in corresponding data transmission time intervals according to an exemplary embodiment of the present invention.

FIG. 3 is a diagram illustrating an example of transmitting, by a plurality of stations, data in corresponding data transmission time intervals according to an exemplary embodiment of the present invention. Hereinafter, transmission of data, by a plurality of stations, in corresponding data transmission time intervals will be described in more detail with reference to FIG. 3.

As described above, the access point may simultaneously receive a number of data streams corresponding to a number of receive antennas of the access point. However, if a number of the data streams is greater than the number of receive antennas, the access point may control a data stream transmission time so that the number of data streams simultaneously transmitted by the transmitting stations may be equal to or less than the number of receive antennas.

Referring to FIG. 3, a first station 310, a second station 330, a third station 350, and a fourth station 370 are selected as transmitting stations. In a first time interval, the first time station 310 and the second station 330 may transmit a data stream, respectively. In the first time interval, the third station 350 may not transmit a data stream. Thus, the number of data streams transmitted by the first station 310 and the second station 330 in the first time interval may be the same as or less than the number of receive antennas of the access point.

A state of a wireless channel may vary over time. Therefore, a state of a wireless channel from the third station 350 to the access point that is poor in the first time interval may improve in a second time interval. Accordingly, in the second time interval, the third station 350 may be selected as a transmitting station to transmit a data stream. The first station 310 and the second station 330 may not be selected as transmitting stations in the second time interval and therefore may not transmit data streams in the second time interval. Specifically, the third station 350 selected as the transmitting station may transmit the data stream in the second time interval.

In a third time interval, the first station 310 and the third station 350 may be selected as the transmitting stations. Therefore, the first station 310 and the third station 350 may transmit data streams, whereas the second station 330 may not transmit a data stream in the third time interval.

Throughout the entire time interval, the fourth station 370 may have a relatively poor wireless channel state and may not be selected as a transmitting station.

Referring to FIG. 3, each of the first station 310, the second station 330, the third station 350, and the fourth station 370 may be selected as the transmitting station depending on its wireless channel state. Further, in reference to the description of FIG. 3 above, each of the first station 310, the second station 330, the third station 350, when selected as a transmitting station, may transmit data streams in the selected time intervals using one or more data transmit antennas according to the wireless channel states and identifiers sent from the access point.

Figure 4:
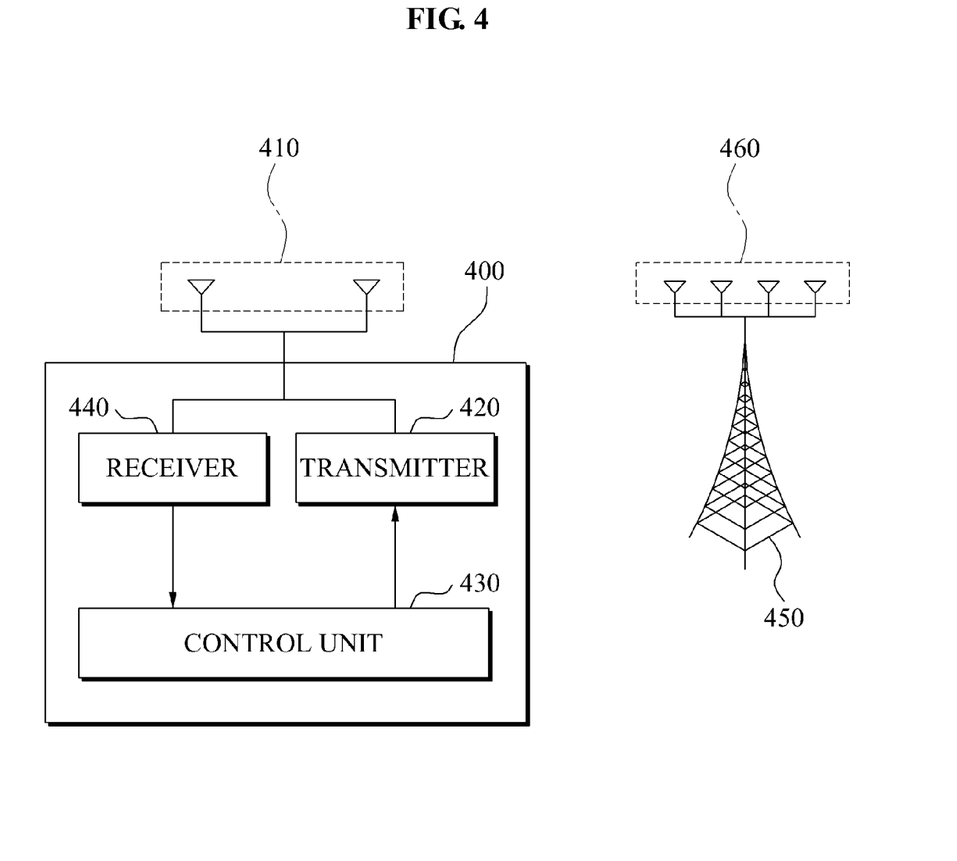
FIG. 4 is a block diagram illustrating a structure of a station according to an exemplary embodiment of the present invention.

FIG. 4 is a block diagram illustrating a structure of a station according to an exemplary embodiment of the present invention. Hereinafter, an operation of the station will be described in more detail with reference to FIG. 4.

Referring to FIG. 4, the station 400 may include transmit antennas 410, a transmitter 420, a control unit 430, and a receiver 440. The transmitter 410 may transmit a channel measurement signal to an access point 450 using at least one of the transmit antennas 410. The access point 450 may generate a channel state matrix with respect to wireless channels formed from transmit antennas to the access point 450. The access point 450 may select, from stations accessing the access point 450 based on the channel state matrix, a transmitting station to transmit a data stream to the access point 450.

The receiver 440 may receive an identifier of at least one transmitting station that is determined based on the channel measurement signal and selected by the access point 450. The receiver 440 may receive a predetermined length of a data frame that includes an identifier of at least one transmitting station.

After receiving an identifier of a transmitting station, the receiver 440 may receive an indicator indicating whether an identifier of a second transmitting station is transmitted. The receiver 440 may determine whether to receive the identifier of the second transmitting station based on the indicator. If a number of transmitting stations is large, the receiver 440 may consecutively receive identifiers of transmitting stations.

The control unit 430 may determine a data transmission rate of a data stream based on a number of the transmit antennas 410 and a number of receive antennas 460 of the access point 450. The control unit 430 may determine a number of data streams to be in proportion to the number of transmit antennas 410 and the number of receive antennas 460.

If the transmitter 420 transmits multiple data streams to the access point 450, the control unit 430 may determine a data transmission rate with respect to the individual data streams.

The transmitter 420 may transmit a data stream to the access point 450 based on the identifiers of transmitting stations and the data transmission rate. The transmitter 420 may compare identifiers of transmitting stations received by the receiver 440 with an identifier of the station 400. If the identifier of the station 400 is included in the identifiers of the transmitting stations, the transmitter 420 may transmit a data stream to the access point 450.

The receiver 440 may receive channel measurement signal allocation information from the access point 450. The transmitter 420 may generate a channel measurement signal based on the channel measurement signal allocation information, and transmit the generated channel measurement signal to the access point 450. Specifically, the access point 450 may be aware of the channel measurement signal to be transmitted by the transmitter 420. The access point 450 may receive the channel measurement signal to determine the station from which the channel measurement signal is received.

The station 400 may include multiple transmit antennas 410. The receiver 440 may receive different channel measurement signal allocation information for each of the transmit antennas 410. For example, the transmitter 420 may generate different channel measurement signals for each of the transmit antennas 410, and transmit the generated channel measurement signals to the access point 450 using each of the transmit antennas 410.

The access point 450 may receive the channel measurement signals and determine the transmit antennas 410 from which the channel measurement signals are received. The access point 450 may generate a channel state matrix with respect to wireless channels formed from each of the transmit antennas 410 to the access point 450 using the channel measurement signals.

The access point 450 may select a data transmit antenna of a transmitting station based on the channel state matrix. Also, the access point 450 may select, as a data transmit antenna from the transmit antennas 410 of stations 400, a transmit antenna with a relatively good wireless channel state. The access point 450 may select, as data transmit antennas, a number of transmit antennas that is equal to or less than the number of receive antennas 460 of the access point 450.

The receiver 420 may receive, from the access point 450, an identifier of a data transmit antenna that is selected from among transmit antennas of a transmitting station. The transmitter 420 may transmit at least one data stream to the access point 450 by considering the identifier of the data transmit antenna.

The receiver 420 may receive, from the access point 450, data transmission time interval information associated with each transmitting station.

The access point 450 may determine a data transmission time interval where each transmitting station transmits a data stream, by considering the number of receive antennas 460 of the access point 450. The access point 450 may determine the data transmission time interval with respect to each transmitting station, so that only a transmitting station with a number of transmit antennas that is the same as or less than the number of receive antennas 460 is transmitting is a given time interval.

The transmitter 420 may transmit a data stream to the access point 450 based on data transmission time interval information.

Figure 5:
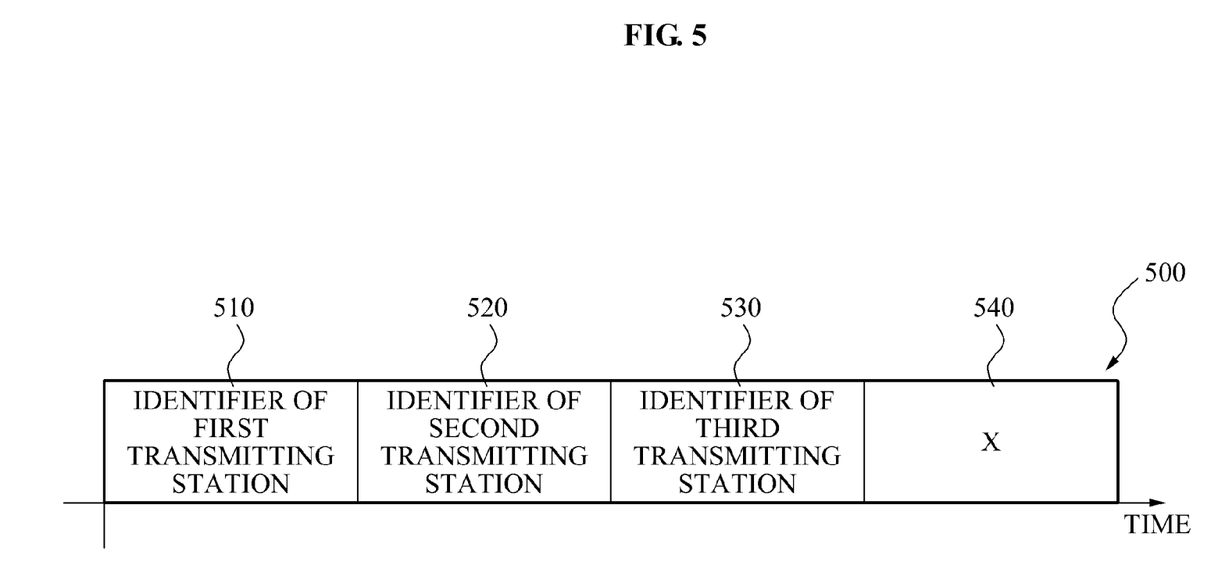
FIG. 5 is a diagram illustrating a structure of a data frame that includes identifiers of transmitting stations according to an exemplary embodiment of the present invention.

FIG. 5 is a diagram illustrating a structure of a data frame that includes identifiers of transmitting stations according to an embodiment of the present invention. Hereinafter, an embodiment of the present invention to transmit identifiers using a data frame will be described in more detail with reference to FIG. 5.

As described above, an access point may select, from a plurality of stations, a transmitting station to transmit a data stream to the access point. The access point may transmit an identifier of the selected transmitting station to each station to identify the station selected as the transmitting station.

Thus, an access point may transmit, to each station, a data frame that includes identifiers of the selected transmitting stations. Referring to FIG. 5, an identifier 510 of a first transmitting station, an identifier 520 of a second transmitting station, and an identifier 530 of a third transmitting station may be included in a data frame 500. Although only the single data frame 500 is illustrated in FIG. 5, the access point may transmit the identifiers of the transmitting stations using multiple data frames. In FIG. 5, a region 540 that does not include an identifier of a transmitting station may be included in the data frame 500 according to the number of transmitting stations. Also, the region 540 may include a control signal or a data stream to be transmitted to each station.

As shown in FIG. 5, the access point may transmit an identifier of a transmitting station to each station using an existing data transmission frame or a control signal transmission frame. Specifically, the access point may transmit the identifier of the transmitting station to each station while minimizing a change in an existing data transmission mechanism.

Figure 6:
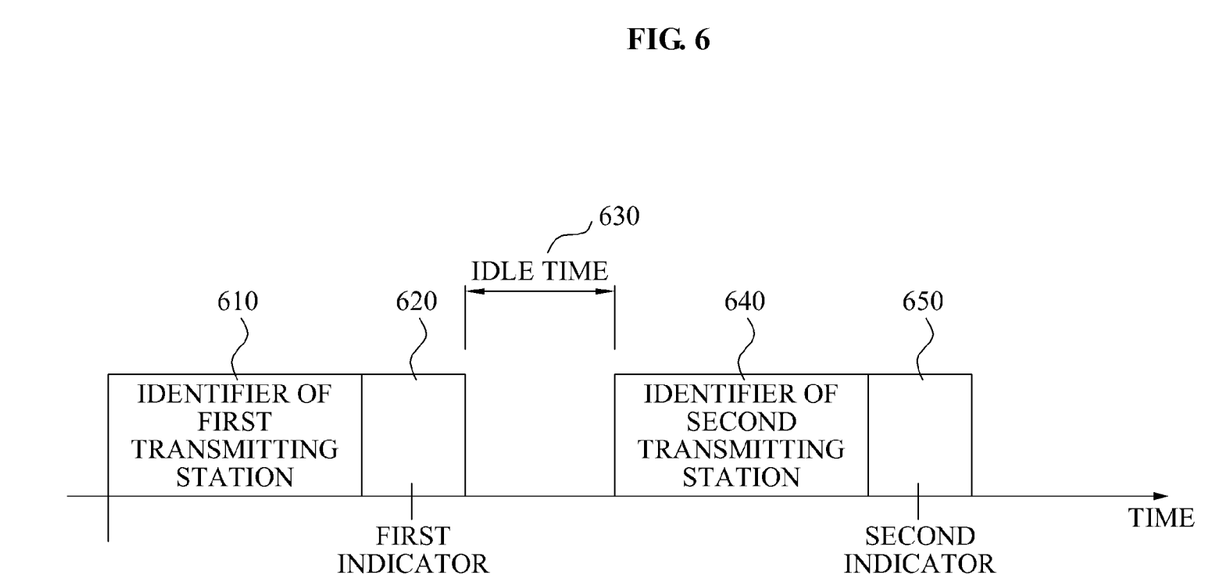
FIG. 6 is a diagram for describing an operation of an access point to transmit an identifier of a transmitting station and an indicator according to an exemplary embodiment of the present invention.

FIG. 6 is a diagram for describing an operation of an access point to transmit an identifier of a transmitting station and an indicator according to an exemplary embodiment of the present invention. Hereinafter, transmission of identifiers of a plurality of transmitting stations using each of the transmitting stations and an indicator will be described in more detail with reference to FIG. 6.

The access point may transmit an identifier 610 of a first transmitting station and transmit a first indicator 620. The first indicator 620 may include information regarding whether the access point will transmit an identifier 640 of a second transmitting station after transmitting the identifier 620 of the first transmitting station. Specifically, each station may receive the first indicator 620 to be aware of whether the identifier 640 of the second transmitting station is to be transmitted.

Although the access point transmits the identifier 610 of the first transmitting station and then transmits the first indicator 620 without any time gap there between as shown in FIG. 6, the access point may transmit the first indicator 620 at a predetermined time interval after the identifier 610 of the first transmitting station is transmitted.

The access point may transmit the identifier 640 of the second transmitting station after a predetermined idle time 630 is elapsed after transmitting the first indicator 620. The access point may transmit a second indicator 650 after transmitting the identifier 640 of the second transmitting station. In FIG. 6, only two transmitting stations, that is, the first transmitting station and the second transmitting station are selected. Therefore, the second indicator 650 may include information indicating that an identifier of a third transmitting station is not transmitted after transmitting the identifier 640 of the second transmitting station. Alternatively, although not shown in FIG. 6, the access point may transmit an identifier and indicator for additionally selected transmitting stations after transmitting the second indicator 650.

If, however, a station receives the second indicator 650 including information indicating that an identifier of a third transmitting station is not to be transmitted, the second indicator 650 may terminate an operation of receiving an identifier of a transmitting station.

Figure 7:
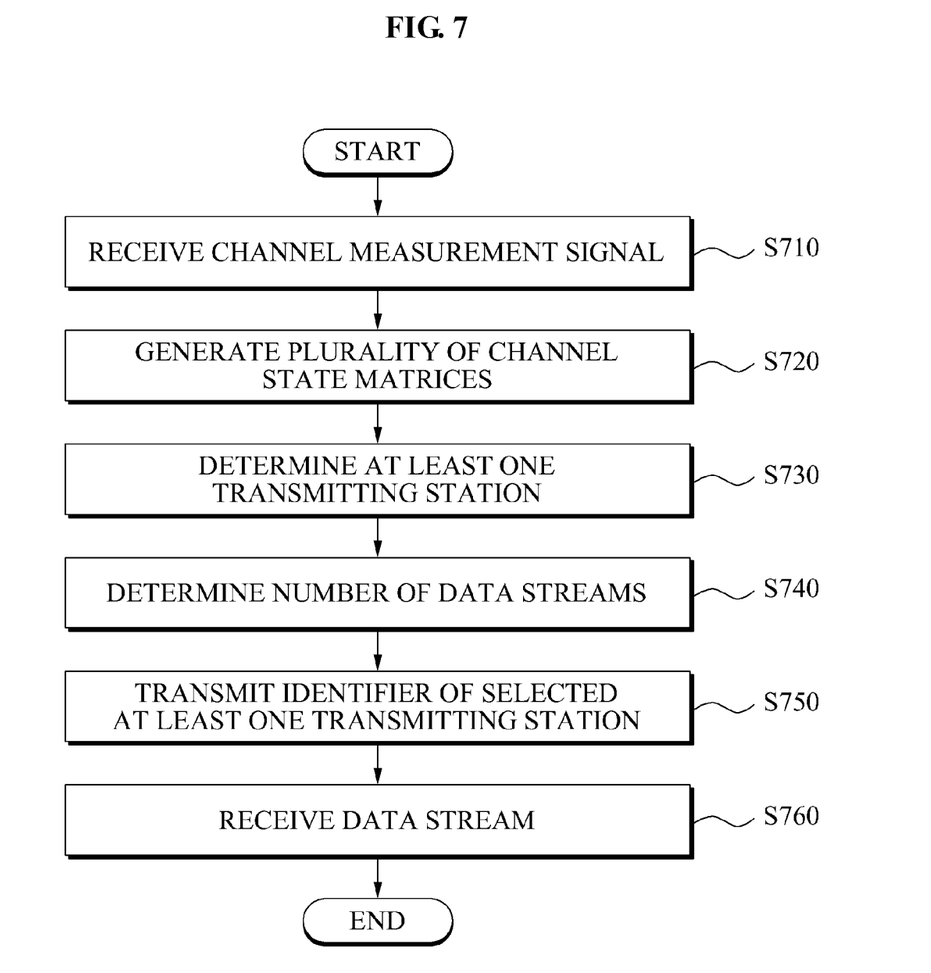
FIG. 7 is a flowchart illustrating a method for receiving data according to an exemplary embodiment of the present invention.

FIG. 7 is a flowchart illustrating a method for receiving data according to an exemplary embodiment of the present invention. Hereinafter, the method for receiving data will be described in more detail with reference to FIG. 7.

Referring to FIG. 7, the method may be performed by an access point in a MIMO-based WLAN. In operation S710, the access point may receive a channel measurement signal from multiple stations using multiple receive antennas. Here, the channel measurement signal may include a pseudo noise code or a predetermined length of an orthogonal code. The access point may classify channel measurement signals based on a phase offset difference between the channel measurement signals transmitted by stations in operation S710. Also, in operation S710, the access point may classify the channel measurement signals based on an orthogonality of the channel measurement signals.

In operation S720, the access point may generate channel state matrices with respect to wireless channels formed from each of the station antennas to the multiple receive antennas using the channel measurement signals. Each station may transmit a channel measurement signal to an access point using multiple transmit antennas. In this case, the number of rows in the channel state matrix may be based on the number of receive antennas, and the number of columns in the channel state matrix may be based on the number of transmit antennas.

Each station may transmit a channel measurement signal to an access point using only a single transmit antenna. In this case, a channel state matrix may be in a vector form having elements corresponding to the number of receive antennas.

In operation S730, the access point may determine at least one transmitting station to transmit data by considering the channel state matrices and the number of receive antennas. The access point may determine a state of a wireless channel between a transmitting antenna and a receiving antenna based on a channel state matrix in operation S730. Also, the access point may measure an SINR with respect to the wireless channel based on the state of the wireless channel, and may determine that the wireless channel is relatively good if the SINR has a large value.

The access point may select a number of stations as transmitting stations that is equal to or less than the number of receive antennas.

In operation S740, the access point may determine a number of data streams to be simultaneously transmitted by each transmitting station. Specifically, the access point may determine a number of data streams that is equal to or less than the number of receive antennas of the access point.

In operation S750, the access point may transmit one or more identifiers corresponding to the selected transmitting stations to each station. Each station may compare its own identifier with the identifiers of the selected transmitting stations to determine whether it is selected as a transmitting station.

In operation S760, the access point may receive a data stream from the one or more selected transmitting stations.

Further, each station may include multiple transmit antennas. In operation S730, a transmitting station may be determined by further considering a number of transmit antennas included in each station. For example, a station including multiple transmit antennas may be selected as a transmitting station, and each transmit antenna may be identified to transmit a data stream to the access point in operation S760.

The access point may individually determine a data transmission time interval when each transmitting station may transmit data in operation S730. If a number of selected transmitting stations is greater than a number of receive antennas of the access point, each transmitting station may receive a different data transmission time interval to transmit data. Therefore, a total number of data streams that are simultaneously transmitted from the data transmit antennas to the access point may be equal to or less than the number of receive antennas of the access point.

Figure 8:
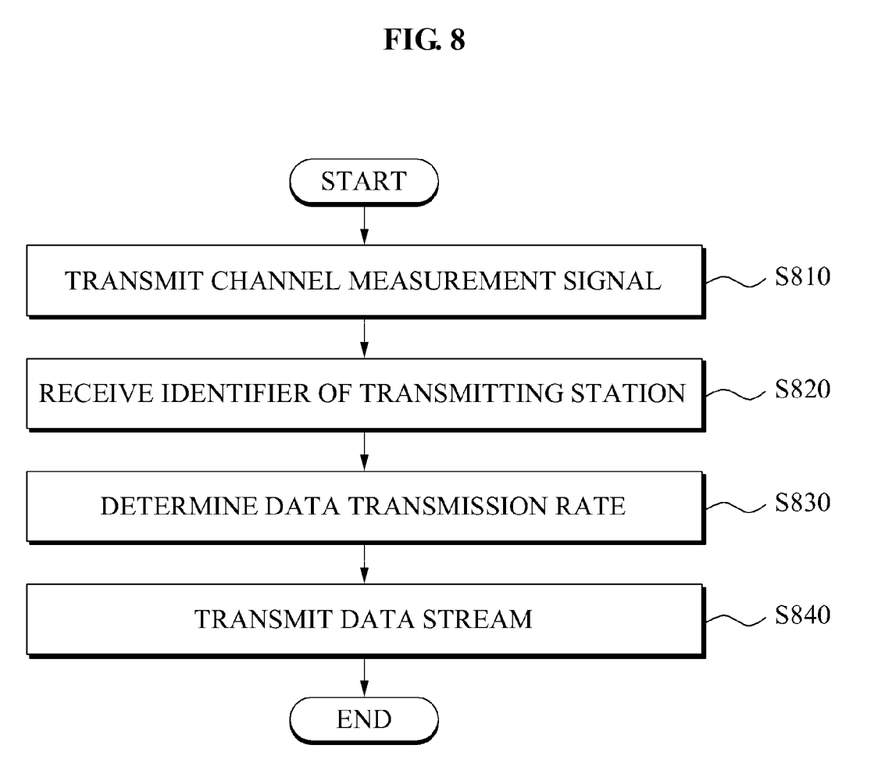
FIG. 8 is a flowchart illustrating a method for transmitting data according to an exemplary embodiment of the present invention.

FIG. 8 is a flowchart illustrating a method for transmitting data according to an exemplary embodiment of the present invention. Hereinafter, the method for transmitting data will be described in more detail with reference to FIG. 8.

Referring to FIG. 8, the method for transmitting data may be performed by a station. In operation S810, the station may transmit a channel measurement signal to an access point using at least one transmit antenna. Here, the channel measurement signal may include a pseudo noise code or a predetermined length of an orthogonal code. The access point may determine that a particular channel measurement signal is transmitted from a particular station using a phase offset of a pseudo noise code or an orthogonality of the orthogonal code, or may determine that the particular channel measurement signal is transmitted from a particular transmit antenna of the particular station.

In operation S820, the station may receive an identifier of a transmitting station that is determined based on the channel measurement signal. The station may receive a data frame that includes an identifier of a transmitting station. Also, in operation S820, the station may receive an identifier of a first transmitting station and then receive an indicator indicating whether an identifier of a second transmitting station is also transmitted. A station may determine whether to perform or terminate an identifier reception process based on the indicator. The station may also compare its own identifier with identifiers of transmitting stations received in operation S820. If the identifier of the station is include in the identifiers of the transmitting stations, the station may determine that the station is selected as a transmitting station.

In operation S830, the station may determine a data transmission rate based on a number of transmit antennas and a number of receive antennas of the access point. The data transmission rate may be determined to be in proportion to the number of transmit antennas and the number of receive antennas.

In operation S840, the station selected as the transmitting station according to the identifiers received in operation S820 may transmit a data stream to the access point according to the data transmission rate.

Figure 9:
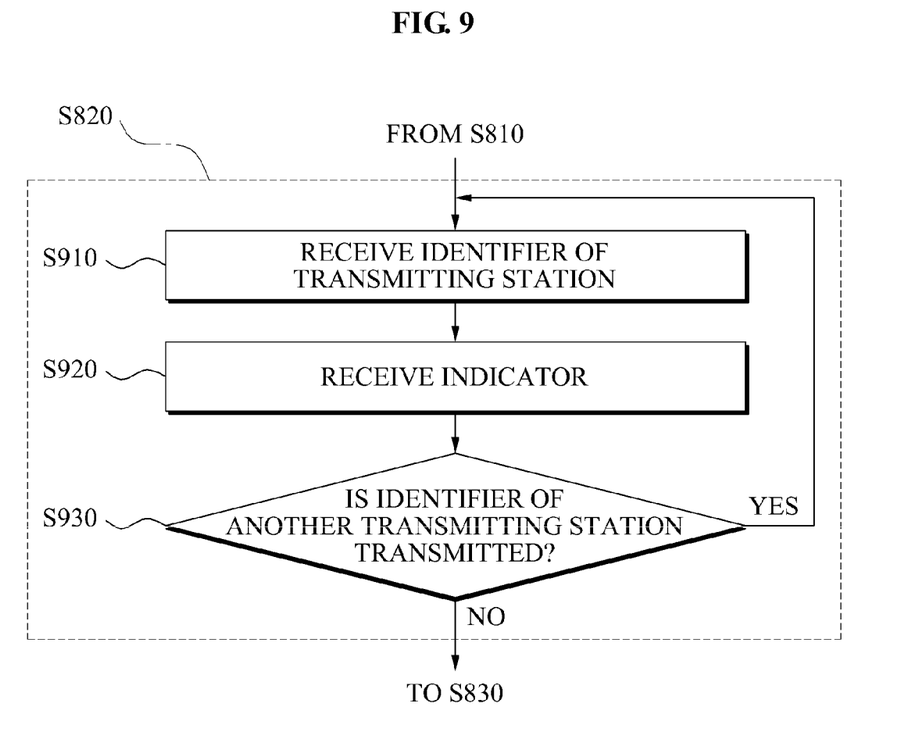
FIG. 9 is a flowchart illustrating an operation for receiving identifiers of transmitting stations shown in FIG. 8.

FIG. 9 is a flowchart illustrating an operation for receiving identifiers of transmitting stations shown in FIG. 8. Hereinafter, an operation for receiving identifiers of transmitting stations will be described in more detail with reference to FIG. 9.

FIG. 9 illustrates a process of receiving the identifier of the transmitting station using an indicator.

In operation S910, the station may receive the identifier of a first transmitting station.

In operation S920, the station may receive an indicator regarding whether an identifier of a second transmitting station is transmitted.

In operation S930, the station may determine whether to continuously receive an identifier of another transmitting station based on the indicator. If the indicator indicates that an identifier transmission is terminated, the station may terminate the identifier reception process and determine the data transmission rate in operation S830.

However, if the indicator indicates that the identifier transmission continues after the transmission of the indicator, the station may return to operation S910 and receive an identifier of another transmitting station.

The data transmission and reception method according to the above-described exemplary embodiments of the present invention may be recorded in computer-readable media including program instructions to implement various operations when executed by a computer. The media may also include, alone or in combination with the program instructions, data files, data structures, and the like. Examples of computer-readable media include magnetic media such as hard disks, floppy disks, and magnetic tape; optical media such as CD-ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An access point, comprising:
a plurality of receive antennas;
a receiver to receive a channel measurement signal and a pseudo-noise (PN) code having an offset from at least one of a first station and a second station, to identify a station transmitting the channel measurement signal, and to identify a transmitting antenna of at least one of the first station and the second station transmitting the channel measurement signal;
a channel estimation unit to generate a channel state matrix with respect to one or more wireless channels formed from at least one of the first station and the second station to the plurality of receive antennas using the received channel measurement signal; and
a scheduler to select the first station as a first transmitting station according to the channel state matrix and a number of the receive antennas,
wherein the receiver receives a first data stream transmitted from the first transmitting station.

2. The access point of claim 1, wherein:
the first station comprises a plurality of transmit antennas, and
the scheduler selects the first transmitting station according to a number of the transmit antennas.

3. The access point of claim 1, wherein the scheduler determines a number of data streams to be simultaneously transmitted to the receive antennas.

4. The access point of claim 1, wherein the scheduler determines a first data reception time interval during which the first transmitting station is to transmit the first data stream to the receiver.

5. The access point of claim 1, further comprising:
a signal-to-interference and noise ratio (SINR) measurement unit to measure an SINR with respect to the one or more wireless channels based on the channel measurement signal,
wherein the scheduler selects the first station as the first transmitting station according to a first SINR of the first station.

6. The access point of claim 1, further comprising:
a transmitter to transmit an identifier of the first transmitting station to the first station and the second station.

7. The access point of claim 1, wherein:
the receiver receives a first channel measurement signal from a first transmit antenna of the first station and a second channel measurement signal from a second transmit antenna of the first station, and
the scheduler selects at least one of the first transmit antenna and the second transmit antenna of the first station as a data transmit antenna to transmit the first data stream to the access point.

8. The access point of claim 7, further comprising:
a transmitter to transmit an identifier of the data transmit antenna to the first station and the second station.

9. The access point of claim 1, wherein the channel measurement signal comprises the PN code or a predetermined length of an orthogonal code.

10. A station, comprising:
a transmitter to transmit a first channel measurement signal and a pseudo-noise (PN) code having an offset to an access point using a first transmit antenna; and
a receiver to receive an identifier of a first transmitting station that is selected by the access point based on a received channel measurement signal and a received PN code having an offset,
wherein if the identifier corresponds to the first transmitting station, the transmitter transmits a data stream to the access point based on the identifier.

11. The station of claim 10, wherein the receiver receives a data frame comprising the identifier of the first transmitting station.

12. The station of claim 10, wherein the receiver receives the identifier of the first transmitting station and an indicator to indicate whether an identifier of a second transmitting station is transmitted in a data frame.

13. The station of claim 10, wherein:
the receiver receives channel measurement signal allocation information from the access point, and
the transmitter generates the first channel measurement signal based on the channel measurement signal allocation information to transmit the first channel measurement signal.

14. The station of claim 10, wherein the transmitter transmits the first channel measurement signal using the first transmit antenna and transmits a second channel measurement signal using a second transmit antenna.

15. The station of claim 14, wherein:
the identifier further identifies a data transmit antenna, and
if the identifier corresponds to the first transmit antenna or the second transmit antenna, the transmitter transmits the data stream by considering the identifier of the data transmit antenna.

16. The station of claim 11, wherein:
the receiver receives, from the access point, data transmission time interval information for the first transmitting station, and
the transmitter transmits the data stream based on the data transmission time interval information.

17. A method for receiving data, comprising:
receiving a channel measurement signal and a pseudo-noise (PN) code having an offset from at least one of a first station and a second station using a plurality of receive antennas for identifying a station transmitting the channel measurement signal, and for identifying a transmitting antenna of at least one of the first station and the second station transmitting the channel measurement signal;
generating a channel state matrix with respect to one or more wireless channels formed from at least one of the first station and the second station to the plurality of receive antennas using the received channel measurement signals;
selecting the first station as a first transmitting station to transmit data according to the channel state matrix and a number of the receive antennas; and
receiving a data stream from the first transmitting station.

18. The method of claim 17, wherein:
the first station comprises a plurality of transmit antennas, and
the first station is selected as the first transmitting station according to a number of the transmit antennas.

19. The method of claim 17, further comprising:
determining a number of data streams to be simultaneously transmitted by the first transmitting station.

20. The method of claim 17, further comprising:
determining a data transmission time interval during which time the first transmitting station is to transmit the data stream.

21. A method for transmitting data, comprising:
transmitting a first channel measurement signal and a pseudo-noise (PN) code having an offset to an access point using a first transmit antenna;
receiving an identifier of a first transmitting station that is selected by the access point based on a received channel measurement signal and a received PN code having an offset;
determining a data transmission rate by considering a number of transmit antennas of the first transmitting station and a number of receive antennas of the access point; and
if the identifier corresponds to the first transmitting station, transmitting a data stream to the access point based on the identifier and the data transmission rate.

22. The method of claim 21, wherein the identifier is received in a data frame.

23. The method of claim 21, wherein the identifier of the first transmitting station is received in a data frame comprising an indicator indicating whether an identifier of a second transmitting station is transmitted in the data frame.

24. A computer comprising a processor and a non-transitory computer-readable recording medium, the medium storing a program to implement the method of claim 17 when executed.

25. A station, comprising:
a plurality of transmit antennas;
a receiver to receive an identifier of a data transmit antenna that is selected by a scheduler of an access point based on channel state matrices and a number of receive antennas of the access point;
a control unit to compare the received identifier with a transmit antenna identifier to determine whether a transmit antenna corresponding to the transmit antenna identifier is selected as the data transmit antenna; and
a transmitter to transmit data to the access point using the transmit antenna corresponding to the transmit antenna identifier;
wherein the access point generates the channel state matrices with respect to wireless channels formed from the station to the receive antennas of the access point using channel measurements signals that the station transmits.

26. A method for transmitting data, comprising:
receiving an identifier of a data transmit antenna that is selected by a scheduler of an access point based on channel state matrices and a number of receive antennas of the access point;

comparing the received identifier with a transmit antenna identifier to determine whether a transmit antenna corresponding to the transmit antenna identifier is selected as the data transmit antenna; and transmitting data to the access point using the transmit antenna corresponding to the transmit antenna identifier;

wherein the access point generates the channel state matrices with respect to wireless channels formed from each of stations to the receive antennas of the access point using channel measurement signals that the stations transmit.

* * * * *

UNITED STATES PATENT AND TRADEMARK OFFICE
CERTIFICATE OF CORRECTION

| | | |
|---|---|---|
| PATENT NO. | : 8,675,510 B2 | Page 1 of 1 |
| APPLICATION NO. | : 12/582164 | |
| DATED | : March 18, 2014 | |
| INVENTOR(S) | : Sung et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this
Twenty-first Day of July, 2015

Michelle K. Lee
*Director of the United States Patent and Trademark Office*